(12) United States Patent
Hsieh et al.

(10) Patent No.: US 6,356,797 B1
(45) Date of Patent: Mar. 12, 2002

(54) METHOD FOR AUTOMATIC SCHEDULING OF PRODUCTION PLAN

(75) Inventors: Ming-Hsiu Hsieh, Panchiao; Wen-Feng Wu, Chu Pei; Min-Huey Tsai, Hsinchu; Yao-Tung Liu, Hsinchu; Lieh-Chang Tai, Hsinchu, all of (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 09/224,958

(22) Filed: Jan. 4, 1999

(51) Int. Cl.⁷ ............................................. G06F 19/00
(52) U.S. Cl. .................. 700/101; 700/99; 702/118; 702/121
(58) Field of Search ................. 702/121, 118; 700/97, 99, 100, 101

(56) References Cited

U.S. PATENT DOCUMENTS

| | | | | |
|---|---|---|---|---|
| 5,375,061 A | * | 12/1994 | Hara et al. | 700/101 |
| 5,402,350 A | * | 3/1995 | Kline | 700/101 |
| 5,442,561 A | * | 8/1995 | Yoshizawa et al. | 700/100 |
| 5,612,886 A | * | 3/1997 | Weng | 700/101 |
| 5,751,580 A | * | 5/1998 | Chi | 700/101 |
| 5,787,000 A | * | 7/1998 | Lilly et al. | 700/95 |
| 5,826,236 A | * | 10/1998 | Narimatsu et al. | 705/8 |

* cited by examiner

Primary Examiner—William Grant
Assistant Examiner—Paul Rodriguez
(74) Attorney, Agent, or Firm—Nath & Associates PLLC; Harold L. Novick

(57) ABSTRACT

A method for automatic scheduling of a production plan. The automatic scheduling system arranges different kinds of production plans and defines a first priority lot, a second priority lot and a normal lot in testing factories. The testing processes of the first priority lot is to decide the testing machine first, then exchanged with a running lot on this testing machine when a test piece is completed. For the second priority lot, after decides the testing machine, the second priority lot is exchanged with a running lot on the testing machine when the running lot is completed. For the normal lot, the procedure is to check if the testing machine is available and need to be setup, then use a setup reduce method to reduce the setup frequency if more than one machine is available and needs to be setup. The key to reduce setup method selects the testing machine which has minimum impact for the subsequent testing lot to get efficient use of the testing machine.

4 Claims, 7 Drawing Sheets

METHOD FOR AUTOMATIC SCHEDULING OF PRODUCTION PLAN

FIELD OF THE INVENTION

The present invention relates to a method for automatic scheduling of a production plan, and more particularly, to a method for reducing setup change frequency of testing machines in testing factories.

BACKGROUND OF THE INVENTION

The modern factories' production lines should always fit the ever-changing customer needs and produce versatile, diversified products. In order to keep the productivity and increased throughput; production control is a major concern in large scaled factories all over the world.

It is a trend for modern factories to use an information system for production control wherein measured data from many facilities is controlled, stored, and, if necessary, processed in a central database. Thus it is also possible to retrieve individual products' production figures or entire product ranges, complied statistics, calculated costs, determine yields, and the like. Access of these databases takes place via a personal computer, with which nearly every work place is equipped with and they are interconnected via a network for data exchange.

A semiconductor integrated circuit (IC) production factory use hundreds of process steps to manufacture desired IC devices. There is also a plurality of testing procedures to ensure the quality and reliability after versatile products are produced. In the past, the planner would collect all the information, such as work in process (WIP) data, loading density of equipment, tester status, master production schedule, etc., to manually decide how and when to make a test of each testing lot. Nevertheless, the top issue that will affect the delivery date and throughput of miscellaneous products under the fixed equipment is every testing machine's setup change frequency. When the testing machine encounters different products after previous lots are completed, the operator will change the accessories for the following different lots in order to fit the testing requirement. In other words, the term "setup" is the activity to interchange the necessary accessories for the various products and verify the completeness of the change.

Changing the setup will sometimes take more than one hour in testing factories. This is because time will be wasted not only on changing the accessories, but verifying the system will also waste time. Sometimes verifying the system takes even more time. When a variety of products are developed, testing machine's setup frequency is increased. Besides, the miscellaneous product mix will also increase the processing time of manual work and inevitably cause some faulty arrangement; this will increase setup frequency at the same time. The more frequently the tester setup changes, the less efficient the tester is utilized.

As previously described about the setup change, the arrangement of the queuing lots to the testing machine depend on the experience and even the intuition of the planner in the past. Sometimes unexpected situations such as unstable output from previous manufacturing will also confused the planner. Manually collected data from external and internal departments, and production plan's scheduling and re-scheduling will take a lot of time. Some basic data such as processing time and tester status can only be accessed by inquiry or human memory. All these disadvantages described not only relate to the production cost, but also affect the throughput of the testing factories.

Since there are not any systematic methods in testing factories to analyze all this related information of the production plan and make an efficient use, a need is created to disclose a method for automatic production plan scheduling.

SUMMARY OF THE INVENTION

Since manual testing lot arrangements in suitable tester groups will waste a lot of time and cause a setup change increase, this invention discloses a method for automatic production plan scheduling, especially for setup change reduction.

It is an objective of this invention to provide a systematic way to manage production schedule automatically.

It is another objective of this invention to shorten planners operation time and to avoid manual mistakes.

It is a further objective of this invention to make sure each machine can produce the right lots at the right time.

First, the invention uses a more direct calculation to decide how to arrange the first priority and second priority lots to the test line according to the emergent level of the lots. Thereafter, most of the queuing lots left belong to the normal lots and need to be handled with more effort. Firstly, all testing machines and accessories should be checked to see if there is a suitable machine that can perform the test or any testing machine that fits the requirement of delivery and create warning reports if there is no machine that can fit the requirement. Next, check that whether or not the setup change is necessary. Select the machine that can provide first and doesn't need to be setup, or select the only machine that needs to be setup. If there is more than one machine available that needs to be setup, use the reduced setup method to lower the setup frequency.

The reduced setup key is to select the idle machine to balance the output of every machine, or select the machine which has the minimum impact for the subsequent testing lots, that is, get the most efficient machine used.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
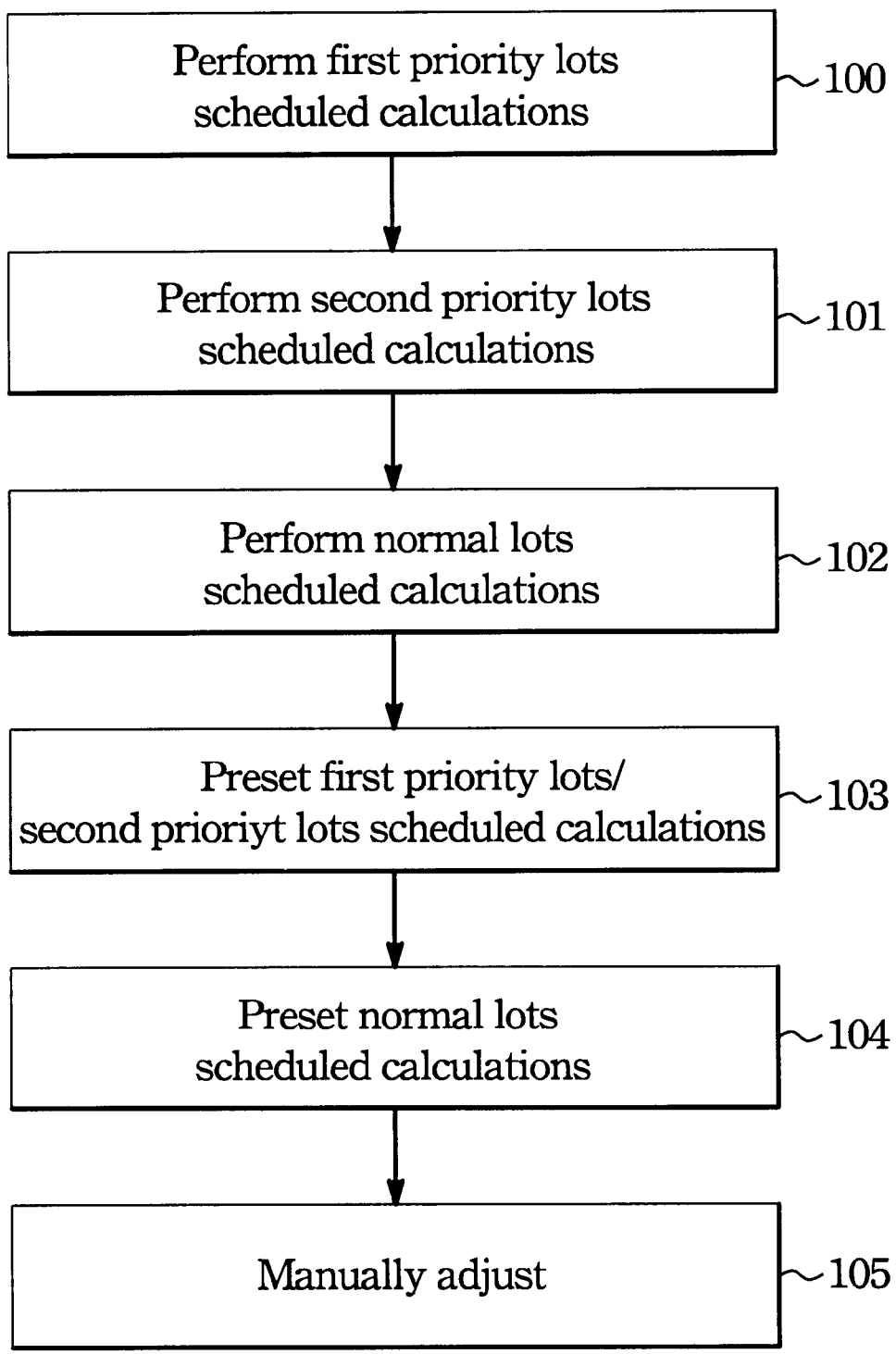
FIG. 1 is a flow chart illustration representing the automated production scheduling system's whole picture according to the present invention.

Referring now to FIG. 1, the figure shows the whole scheme of the automatic production scheduling system according to the invention. The system includes the blocks 100–102 for performing the scheduled calculations of the first priority, second priority, and normal testing lots. The blocks 103–104 for presetting the scheduled calculations of the first priority, second priority, and normal testing lots. The block 105 is used for manually adjusting the testing lots.

Since the manufacturing factory will always have different kinds of production plans, production plan re-scheduling, etc., there are a lot of products that need to be considered in advance according to the customer's requirement. The factories' policy will always be to categorize miscellaneous products into different priorities.

In order to complete the automatic production scheduling system, one should collect all the information needed to input it into the computer and make an analysis. The information needed in this embodiment includes work in process (WIP) data, forecast wafer-in data, master production schedule, testing machine status, accessories information, etc. If there is an information lack, then some testing lots may not meet the calculation requirement and need manual adjustment to arrange the testing. The block 105 is the last step to manually adjust to a remedy for unclear testing lots.

The automatic production scheduling system can also produce some useful data including performance index statistic data, estimated production volume, estimated finish time, delivery delay warning, etc. to accomplish the system.

Figure 2:
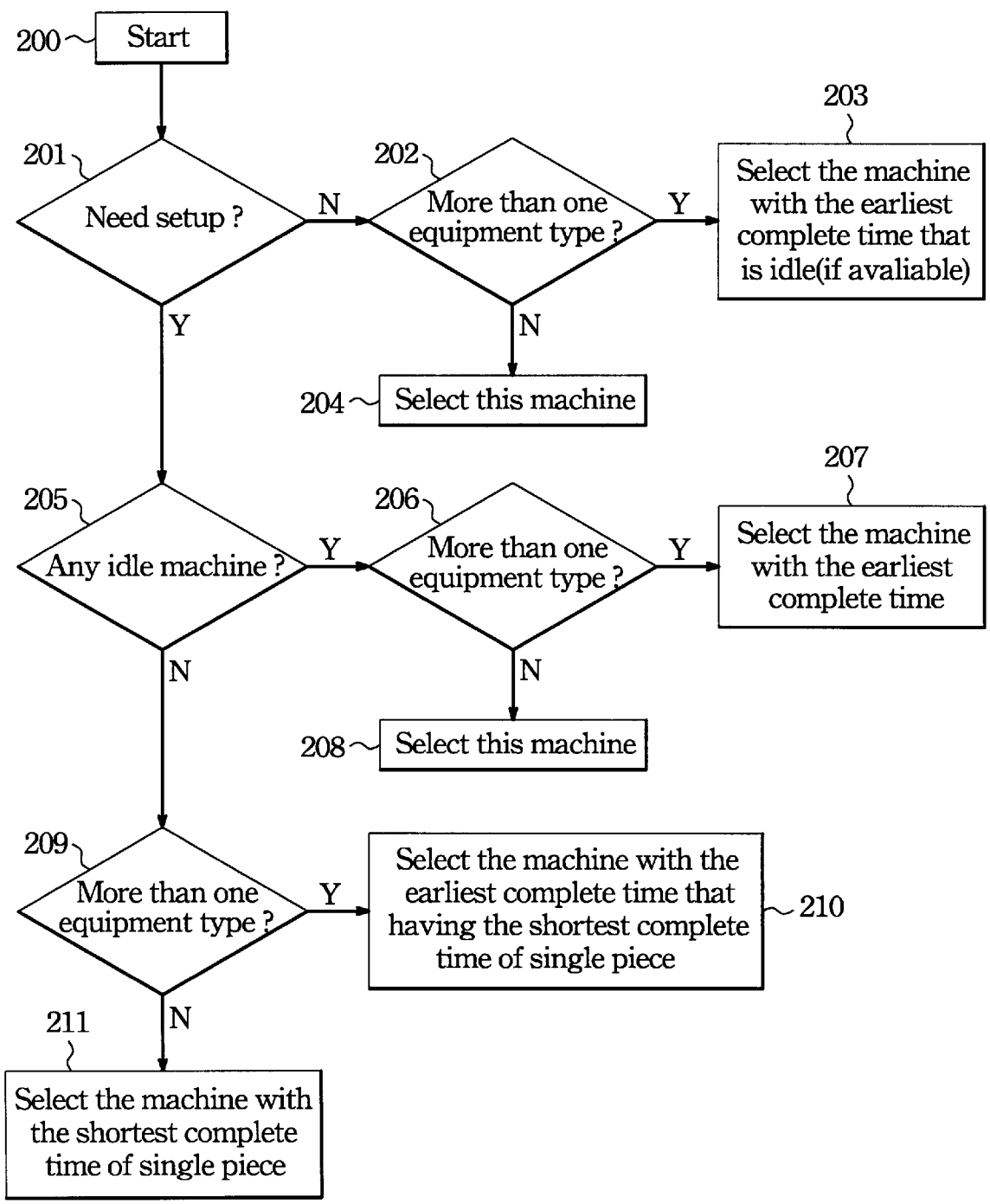
FIG. 2 is a flow chart illustration representing the first priority lots' scheduled calculations according to the present invention.

Referring to FIG. 2, it shows a flow chart for scheduled calculations of the first priority testing lots according to the invention. The policy of this level is to decide the testing machine first, if there is a running lot on this machine, then the first priority lot should be exchanged with the running lot as soon as the test piece on the machine is accomplished.

In order to decide the testing machine according to the policy, the block 201 checks to insure if there is any testing machine that is unnecessary to be setup. As mentioned before, the term "setup" is the activity to interchange the machine's necessary accessories for the different products and verify the completeness of the change.

If the machine doesn't need to be setup, then the block 202 checks to find out how many equipment types can perform the test. The block 203 selects the machine with the earliest complete time of said first priority lot that doesn't need to be setup and is idle (if available), or the block 204 selects the only type of machine that doesn't need to be setup.

If the machine needs to be setup, then the block 205 checks to see if whether there is any idle machine or not. Next, if there are idle machines, then the block 206 checks how many equipment types can perform the test. If there are more than one type of machine can perform the test, then the block 207 selects the machine with the earliest complete time of said first priority lot that is idle; if only one machine is available, then the block 208 selects this machine that is idle.

If none of the idle machines are available, then the block 209 checks to see how many equipment types can perform the test. If there is more than one type of machine can perform the test, then the block 210 selects the machine with the earliest complete time of said first priority lot that has the shortest complete time of single piece being tested; if only one type of machine can perform the test, then the block 211 selects the machine with the shortest complete time of the single piece being tested.

Figure 3:
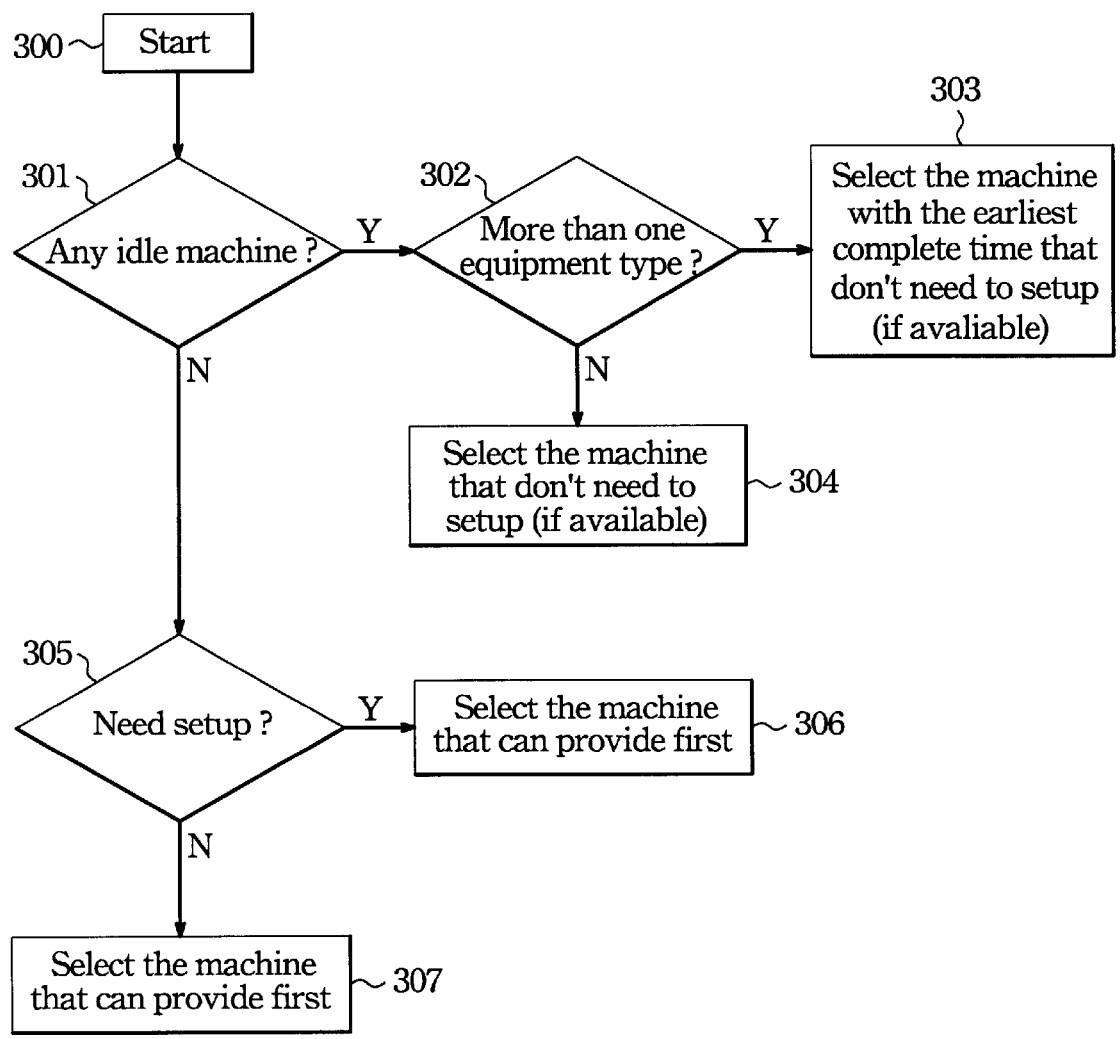
FIG. 3 is a flow chart illustration representing the second priority lots' scheduled calculations according to the present invention.

Now referring to FIG. 3, the figure shows a flow chart for a scheduled calculation of the second priority testing lots according to the invention. The policy of the second priority lots is first to decide the testing machine, then if there is a running lot on this machine, exchange the running lot for second priority lot as soon as the test lot on the machine is accomplished.

First, the block 301 checks if there is any idle machine that can be used. If there are idle machines, then the block 302 checks how many types of machines can perform the test. Subsequently, if more than one type of machine can perform the test, the block 303 selects the machine with the earliest complete time of said second priority lot that is idle and preferably doesn't need to be setup (if available). If only one type of machine exists, then the block 304 selects this machine that is idle and preferably doesn't need to be setup.

If none of the idle machines are available, then the block 305 checks the running machine to see whether they need to be setup or not. Then the block 306 selects the machine that can provide first and needs to be setup, or the block 307 selects the machine that can provide first but doesn't need to be setup.

Figure 4:
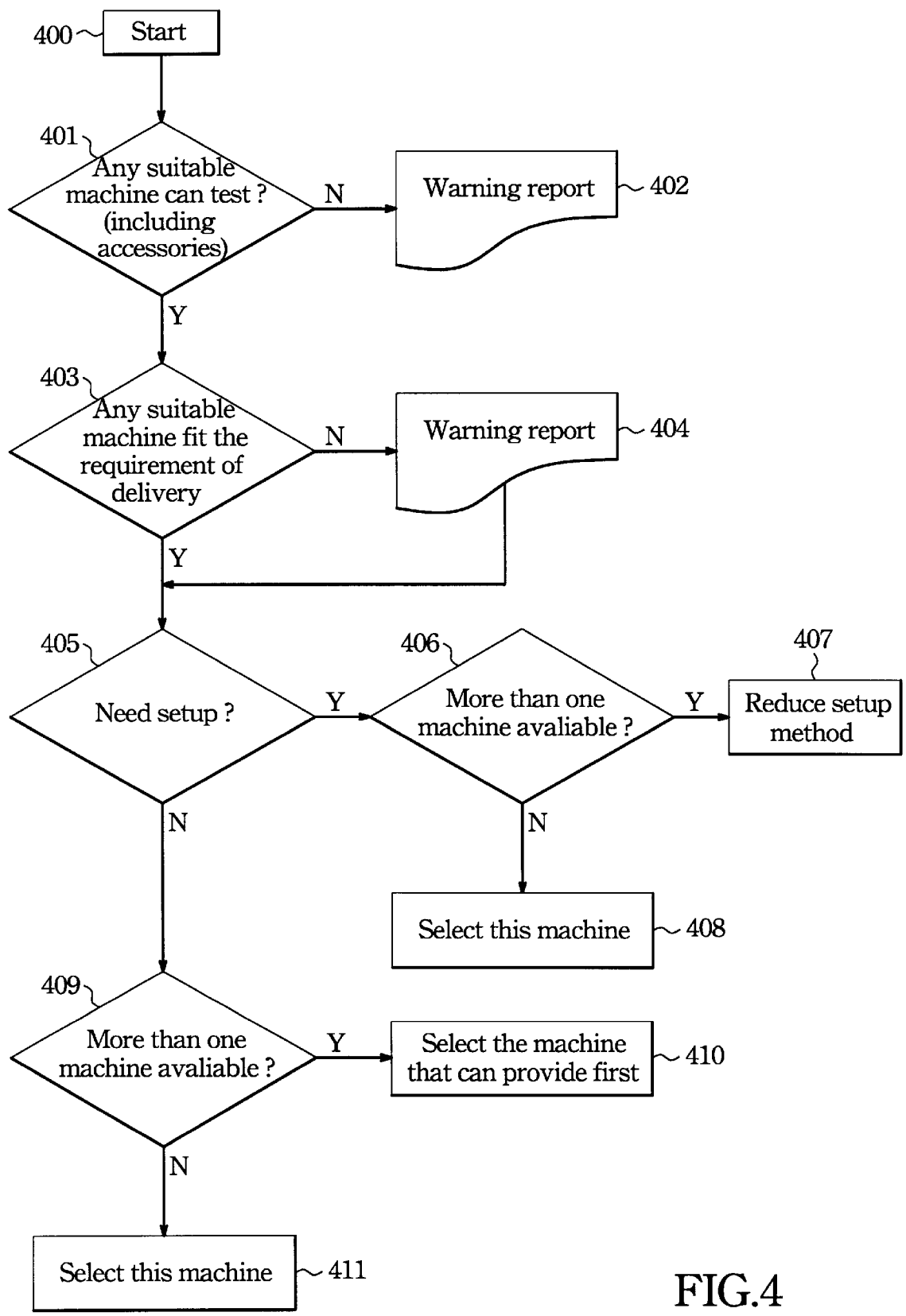
FIG. 4 is a flow chart illustration representing the normal lots' scheduled calculations according to the present invention.

Referring to FIG. 4, the figure shows a flow chart for a scheduled calculation of the normal lots according to the invention. Except for the first priority lots and second priority lots, most of the queuing lots belong to the normal lots. All the efficiency promotion and cost savings also count on the logical arrangement of the normal lots.

The block 401 checks first to see if there are any suitable machines that can perform the test, including accessories. If the answer is no, it sends a warning report 402 to warn the operator about this abnormal situation; if the answer is yes, then it goes to the block 403 to check if there are any suitable machines that can fit the delivery requirement. There will be a warning report 404 if there is no machine in accordance with the due date.

Whenever there is any suitable machine that can fit the delivery requirement, one shall proceed with the following procedures. In the block 405 it checks to see if the machine needs to be setup or not. If the testing machine needs to be setup, then it goes to the block 406 to check how many machines can perform the test; if the testing machine doesn't need to be setup, then it goes to the block 409 to check also how many machines can perform the test.

In the block 406, if more than one machine is available, then it goes to the block 407 for a reduced setup method, otherwise it goes to the block 408 to select this machine. Alternatively in the block 409, if more than one machine is available, then it goes to the block 410 to select the machine that can provide first, otherwise it goes to the block 411 to select the only machine.

Turning to FIG. 5 and FIGS. 6A–6D, FIG. 5 shows a methodology to reduce setup frequency according to the present invention and is a detailed explanation from the block 407 of FIG. 4, that means there is more than one machine that can perform the test and the machine needs to be setup before testing. FIGS. 6A–6D are diagrammatic explanations based on FIG. 5.

Figure 5:
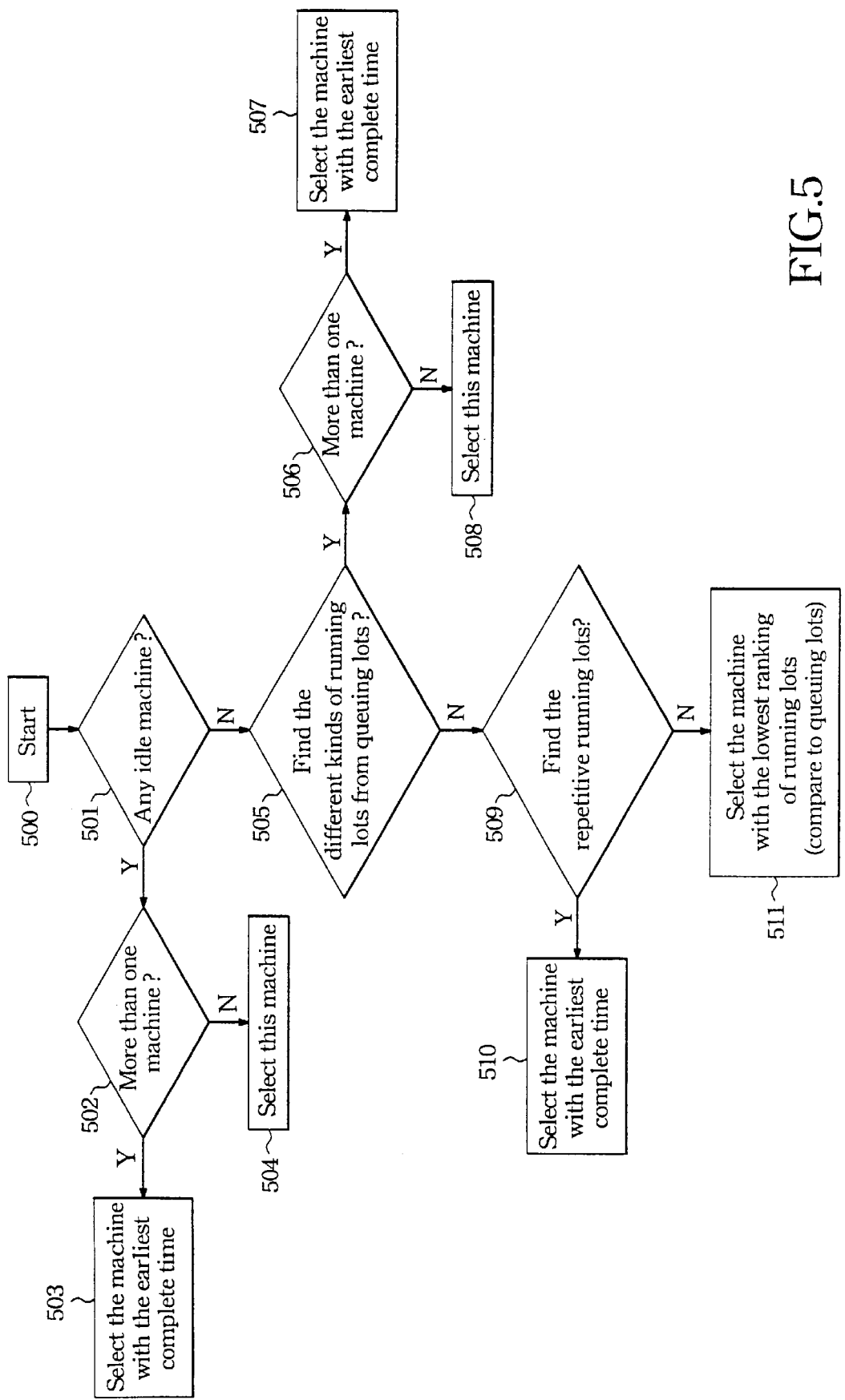
FIG. 5 is a flow chart illustration representing the method to reduce setup changes according to the present invention.

Referring to FIG. 5 first, since the testing machine needs to be setup before loading the testing lot, the best way is to select an idle machine from the tester group. From the beginning of the block 501, it checks whether there are any idle machines or not. Preferably, the testing is arranged to an idle machine to get a more balanced throughput of the tester group.

If there are idle machines, then the block 502 checks how many machines can perform the test. Then the block 504 selects the machine when only one machine is available, or the block 503 selects the machine with the earliest complete time of said normal lot if more than one machine is available.

If every machine is running, the block 505 will find out whether the types of queuing lots for testing (except for the headed queuing lot) are different from the running lots. That is, the headed testing lot will choose the machine in which the types of running lots are different from the queuing lots in order to reduce the setup frequency of subsequent lots. If it actually has, then the block 506 checks for the quantity of the testing machines. If there is more than one machine available, the block 507 will select the machine with the earliest complete time of said normal lot; if there is only one machine, then the block 508 will select this machine. For better understanding, refer to FIGS. 6A and 6B again. FIG. 6A has the same meaning as the block 508 and FIG. 6B has the same meaning as the block 507.

First refer to FIG. 6A, the diagram represents a plurality of testing machines 1, 2, 3 and 4 in which the lots labeled A, B, C and D are running, the lots labeled E, B, C and D represent the queuing lots sequence that waiting for test. Due to the headed lot "E" waiting for input is different from all the running lots, so the machine has to be setup before input of "E" lot. Since some of the running lots have the same type as the subsequent queuing lots (i.e. B, C, D), therefore the machine can perform the test and will not affect subsequent testing at the same time (i.e. minimize setup frequency) is only machine "1". That is, only the running lot A in machine "1" is different from the queuing lots, and the next testing lot "E" will select this machine (same meaning as the block 508).

Figure 6B:
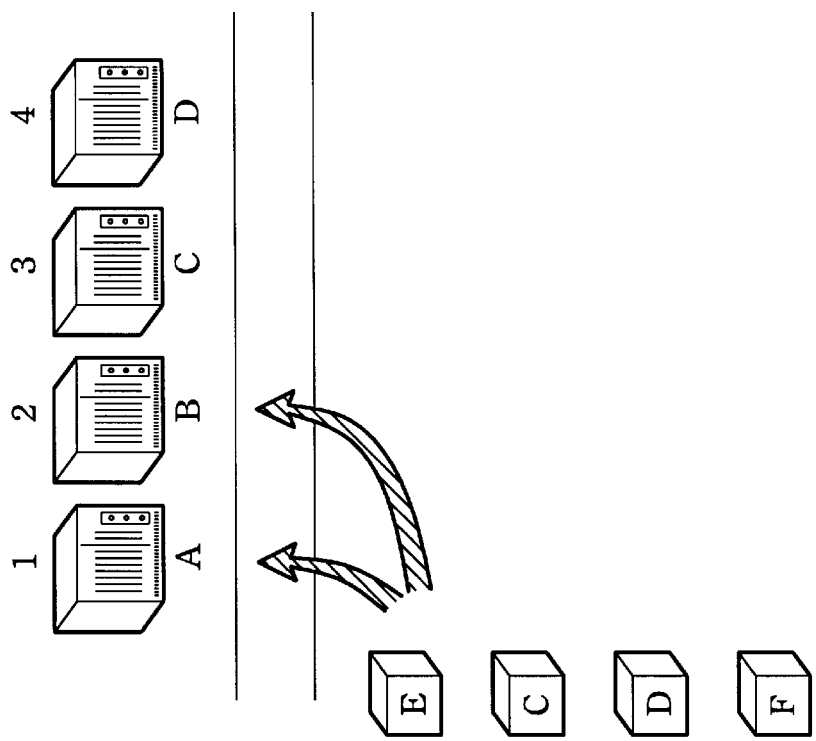
FIGS. 6A–6D represents the method to select the suitable machine according to FIG. 5 of the present invention.
Figure 6A:
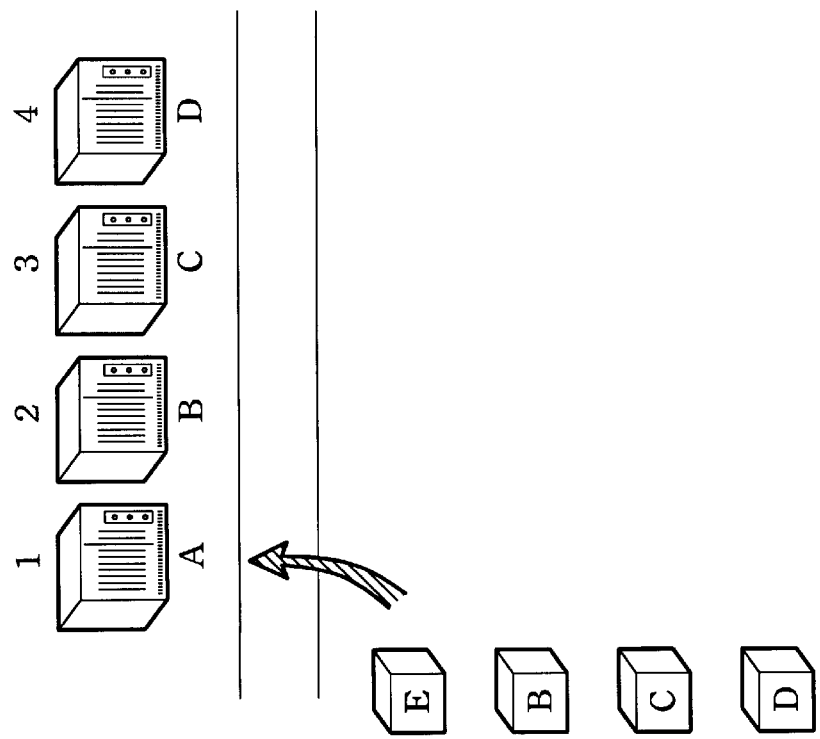

Secondly refer to FIG. 6B, the running lots are the same as FIG. 6A, and the queuing lots labeled E, C, D and F. The selected machine has to be setup before input of the headed "E" lot. Since the running lots of labeled C, D have the same type as queuing lots, preferably select machine 1 and 2 for input of "E" lot to minimize the impact of the following lots. Thereafter select one of the machines with the earliest complete time of said normal lot (same meaning as the block 507).

Figure 6D:
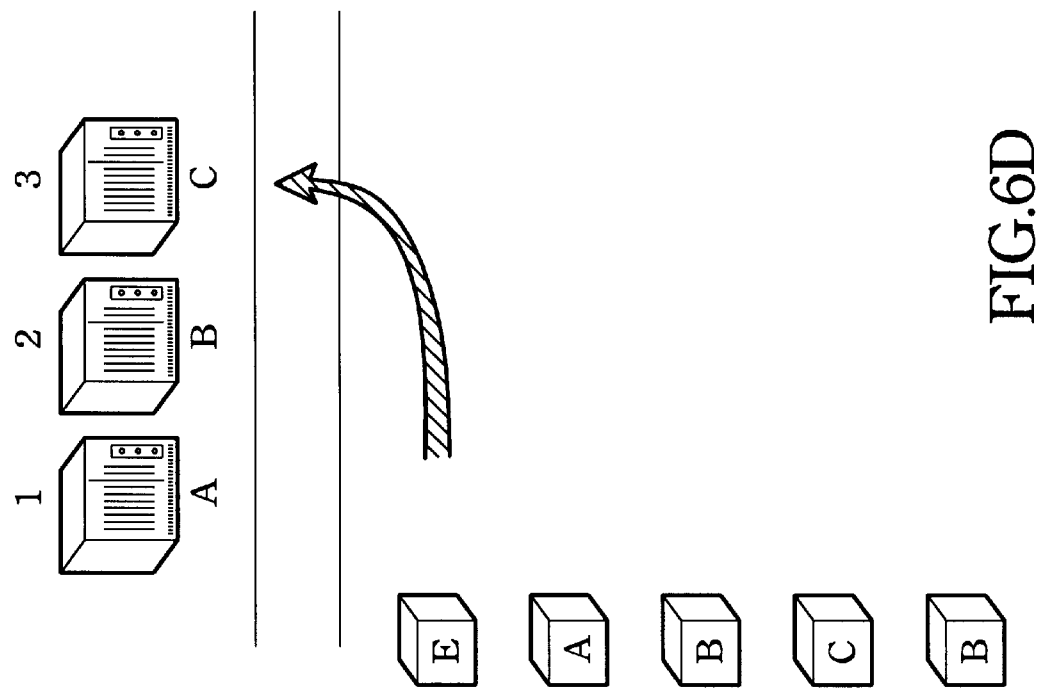
Figure 6C:
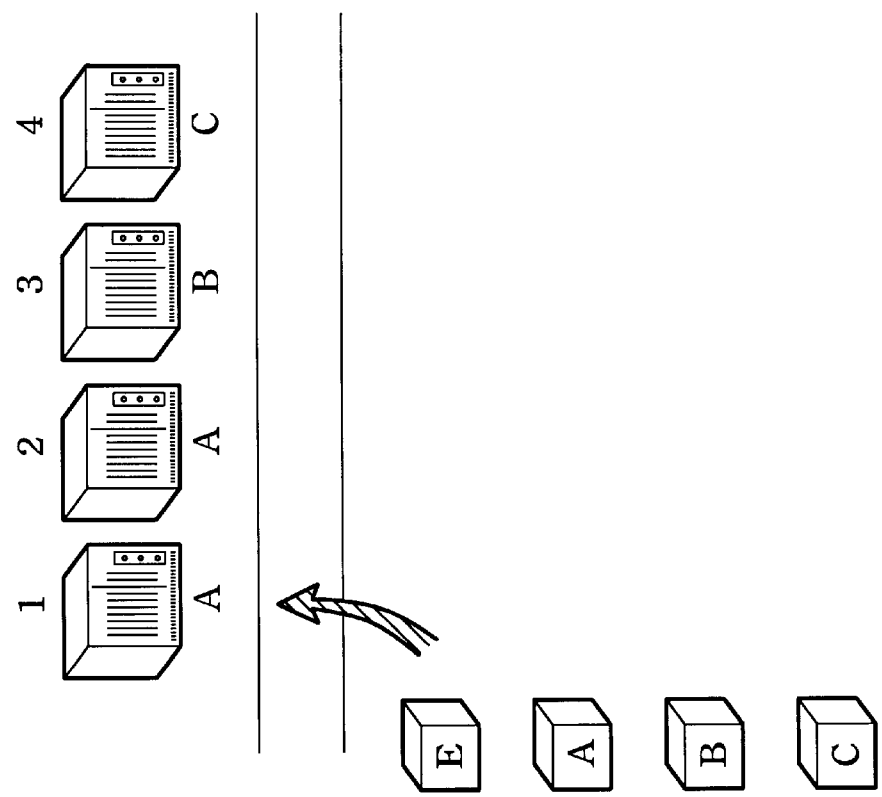

Now returning to FIG. 5, if all the running lots have the same type as the queuing lots, then go to the block 509 to check that whether there are repeated running lots. If there are repeated running lots, then the block 510 selects one of the machines with the earliest complete time of said normal lot from the repeated running lots; if no repeated running lots are found, the block 511 will select one of the machines with the lowest ranking of the running lots when compare to the sequence of queuing lots. Refer to FIGS. 6C and 6D for a detailed description of the block 510 and 511. Wherein FIG. 6C has the same meaning as the block 510 and FIG. 6D has the same meaning as the block 511 respectively.

In FIG. 6C, the running lots are A, A, B and C, with repetitive A lots, and the queuing lots are E, A, B and C. The selected machine should input the first lot "E" and do the setup change. Due to all of the running lots have the same type as the queuing lots (i.e. A, B and C); the best way to select the machine and reduce the setup change of the following lots is to choose the repetitive running lots "A". Choose the one with the earliest complete time from machine 1 and 2. Besides, if there are more than one type of running lots which are repeat, then also select one of the machines with the earliest complete time of said normal lot from all of the repeated running lots.

In FIG. 6D, the running lots are A, B and C, and the queuing lots are E, A, B, C and B. The machine selected for headed "E" lot has to setup before input of "E" lot. All of the running lots have the same type as the queuing lots and without repetition. The rule to select the machine and input headed "E" lot is to compare the running lots A, B and C with the queuing lots A, B, C and B and select the machine with the lowest ranking queuing lots. In FIG. 6D, the result is machine "3" in running "C" lot.

After finishing the systematic automatic scheduling of the production plan, one can easily use this program to schedule the short-term production plan to decrease the machine setup frequency, and re-schedule in a very short time. Therefore the efficiency of the testing machines is greatly improved.

As is understood by a person skilled in the art, the foregoing preferred embodiments of the present invention are illustrations of the present invention rather than limitations of the present invention. It is intended to cover various modifications and similar arrangements included within the spirit and scope of the appended claims, the scope of which should be accorded the broadest interpretation so as to encompass all such modifications and similar structure.

What is claimed is:

1. A method for scheduling a plurality of testing lots on a plurality of testing machines of a testing factory, comprising:

performing scheduled calculations of a first priority lot of said plurality of testing lots and selecting that testing machine of said plurality of testing machines which has an earliest complete time of said first priority lot, said first priority lot being exchanged with a first running lot of said selected testing machine when a testing piece of said first running lot is completed;

performing scheduled calculations of a second priority lot of said plurality of testing lots and selecting a next testing machine of said plurality of testing machines which has an earliest complete time of said second priority lot, said second priority lot being exchanged with a second running lot of said next selected testing machine when said second running lot is completed;

performing scheduled calculations of normal lots of said plurality of testing lots with a reduced setup process when at least two of said plurality of testing machines can be used and need to be setup, said reduced setup process further comprises:

selecting ones of said plurality of testing machines in which running lots of said selected ones of said plurality of testing machines are different from said normal lots and said selected ones of said plurality of testing machines have a first earliest complete time of said normal lots;

selecting further ones of said plurality of testing machines in which a running lot of said further ones of said plurality of testing machines have a repeated type and said further ones of said plurality of testing machines have a next earliest complete time of said normal lots; and comparing said running lots of said ones and further ones of said plurality of testing machines with said normal lots and selecting said running lots of said ones and further ones of said plurality of testing machines with a lowest ranking of said normal lots.

2. The method according to claim 1, wherein during the setup processes said testing machines need to interchange said testing machines' accessories for different products and verify the completeness of the change.

3. The method according to claim 1, wherein the step of performing scheduled calculations of said normal lots further includes checking said testing machines and sending a warning report if none of said testing machines can do the test.

4. The method according to claim 1, wherein the step of performing scheduled calculations of said normal lots further includes checking said testing machines and sending a warning report if none of said testing machines can fit the delivery requirement.

* * * * *